United States Patent [19]

Cheung

[11] Patent Number: 4,591,328

[45] Date of Patent: May 27, 1986

[54] APPARATUS FOR FORMING FORTUNE COOKIE SHAPED ARTICLES

[76] Inventor: Yau T. Cheung, 2348 S. Canal St., Chicago, Ill. 60616

[21] Appl. No.: 727,592

[22] Filed: Apr. 26, 1985

[51] Int. Cl.$^4$ .................. A21C 11/02; A21C 15/02
[52] U.S. Cl. .................. 425/324.1; 99/353; 99/450.4; 99/450.6; 425/374; 425/385; 425/397
[58] Field of Search .................. 425/324.1, 383, 363, 425/374, 112, 500, 385, 397; 426/502; 198/663, 669, 662, 625; 99/450.4, 450.6, 450.1, 353, 354, 373, 450.7

[56] References Cited

U.S. PATENT DOCUMENTS

| | | | |
|---|---|---|---|
| 3,265,016 | 8/1966 | Cheung | 425/112 |
| 3,605,642 | 11/1968 | Brown | 99/373 |
| 3,791,508 | 2/1974 | Osborne et al. | 198/625 |
| 3,841,946 | 10/1974 | Carter | 198/625 |
| 3,884,347 | 5/1975 | Gallagher et al. | 198/625 |
| 3,950,123 | 4/1976 | Louie | 99/373 |
| 4,012,184 | 3/1977 | Ma | 99/373 |
| 4,301,912 | 11/1981 | Cooley et al. | 198/625 |
| 4,339,993 | 7/1982 | Lee | 99/373 |
| 4,431,396 | 2/1984 | Lee | 99/373 |

FOREIGN PATENT DOCUMENTS

| | | | |
|---|---|---|---|
| 77669 | 9/1918 | Fed. Rep. of Germany | 198/663 |
| 0045078 | 4/1979 | Japan | 198/625 |
| 232403 | 4/1925 | United Kingdom | 198/662 |

Primary Examiner—Willard E. Hoag
Attorney, Agent, or Firm—Richard G. Kinney

[57] ABSTRACT

A machine is disclosed for forming food items, such as cookies, into a fortune cookie shape with a paper fortune therein. The machine includes a device for feeding a succession of disc shaped blank food items to a moving track. A roller both advances the blank and forms grooves in the blank at desired creasing lines thereof. A descending arm bearing a fortune slip then folds the blank into a generally half-moon shape by pressing it downward through a slit opening and releasing the fortune slip therein. A pair of worm gears, cylinders with mirror image helical grooves therein, are mounted adjacent to one another and turn in opposite directions. At one end of each cylinder finger-like elements project outward and revolve into simultaneous contact with the points of the half-moon folded blank and serve to both fold them about a thin transverse bar and to deliver opposite sides of the now fortune cookie shaped item into the grooves of the cylinders. These advance the item off of the bar and along the cylinders. A blower aids in cooling and hardening the items as they travel so that they leave the cylinder via a shoot in a hardened finished state.

8 Claims, 13 Drawing Figures

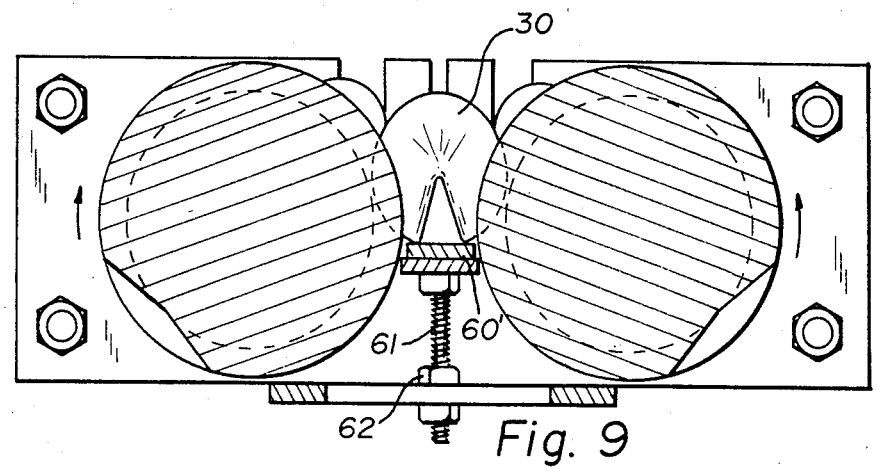
Fig. 9
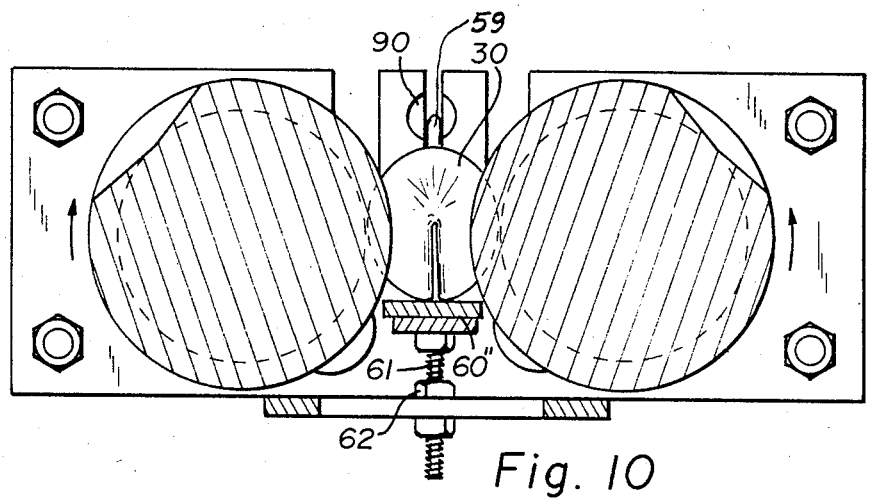
Fig. 10
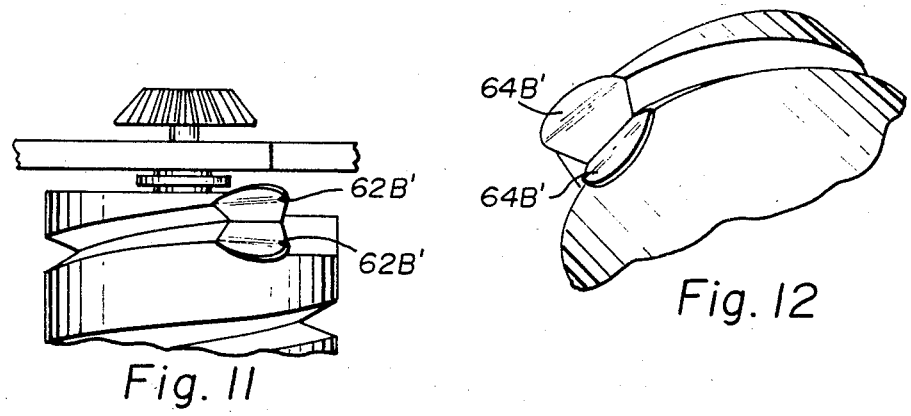
Fig. 11
Fig. 12

APPARATUS FOR FORMING FORTUNE COOKIE SHAPED ARTICLES

FIELD OF THE INVENTION

The present invention is directed to new and improved apparatus and methods for forming food items into fortune cookie shapes and is especially concerned with a method and apparatus for forming fortune cookies.

BACKGROUND OF THE INVENTION

Fortune cookies were invented in San Francisco in the last century. They had their paper—slip "fortunes" inserted by hand and were laboriously formed by hand labor into the familiar fortune cookie shape. In 1963 the first practical apparatus for automatically inserting paper fortunes into fortune cookies and automatically forming them into the fortune cookie shape was introduced by the present inventor, Yau Tak Cheung. U.S. Pat. No. 3,265,016 entitled Fortune Cooky Machine was awarded to Mr. Cheung for this pioneering invention on Aug. 9, 1966.

Since then a number of improvements and alternative apparatuses have been patented, notably U.S. Pat. No. 3,605,642 to R. E. Brown, Fortune Cookie Machine, issued Sept. 20, 1971; U.S. Pat. No. 3,950,123 to E. Louie, Apparatus for Making a Food Product, issued Apr. 13, 1976; and U.S. Pat. No. 3,983,262 to R. H. M. Brunner, et al., Automatic Fortune Cookie Folding Method.

Such apparatus, while a major step forward over hand labor, do not offer the user a great deal of variety in selecting the precise shape of the finished product. Further such apparatus are quite complex and require rapid accelerations and decelerations of various mechanisms including frequent stops and starts of many moving parts. Because of this such apparatus require frequent maintenance and replacement of worn parts.

Also, because of variations in the blank or unfolded food item to be folded, it often happens, with the prior art apparatus, that a portion of the finished products are mishappened and must be rejected.

SUMMARY OF THE INVENTION

Food processing apparatus constructed in accordance with one feature of the present invention comprises a pair of worm gears set parallel to one another and having mirror image grooves formed there and means for turning them in opposite directions at the same rate so that a fortune cookie shaped food item may be held in the grooves and moved longitudinally along the gears.

The grooves serve to keep the item in the desired shape while it hardens and precisely controls the spacing or spread between the points of the fortune cookie shaped item.

A second feature of the invention a roller for forming generally V-shaped creases or score lines in blank (unfolded) items to be so folded so as to make it easier to fold with consistency.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIGS. 9 and 10 are views similar to that of FIG. 8 each illustrating a different arrangement on modification of the apparatus of FIGS. 5-8 for forming differing shapes of fortune cookie shaped items.

FIG. 11 is a partial top view of a modified portion of the apparatus.

FIG. 12 is a perspective fragmented view of the modified embodiment of FIG. 11.

DETAILED DESCRIPTION OF ONE PREFERRED EMBODIMENT

Figure 1:
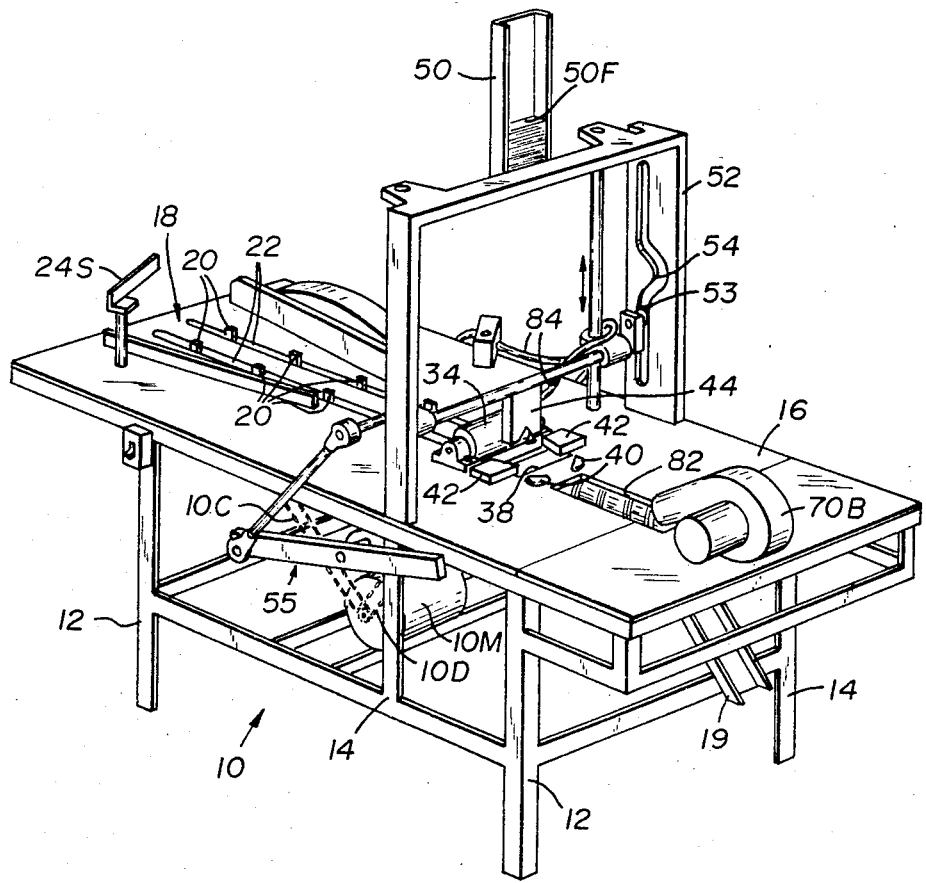
FIG. 1 is a perspective view of a machine for forming food items into a fortune cookie shape constructed in accordance with the principles of the present invention.

Referring to the drawings, and especially FIG. 1, there is depicted a fortune cookie making or forming machine constructed in accordance with the principles of the present invention and generally designated by the number 10.

The machine 10 includes legs 12 that form a part of a framework 14 that supports the operating components of the machine 10 above and below a table-like surface 16. The machine 10 serves to receive a succession of food items such as hot disc shaped cookies at area 18 and delivers finished fortune cookies shaped items at a shoot 19.

Figure 2:
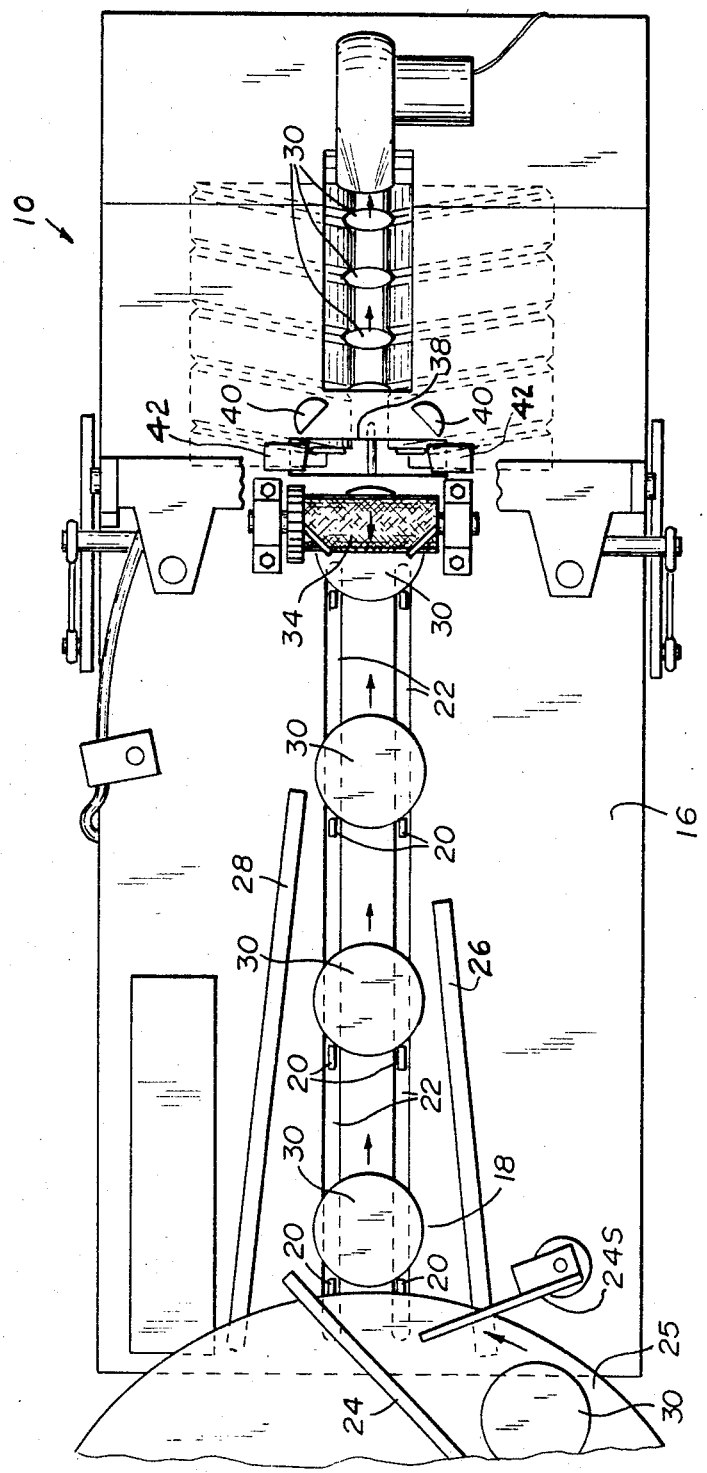
FIG. 2 is a plan view of the machine of FIG. 1 together with part of a cookie oven apparatus and cookie blanks and cookies.

As best shown in FIG. 2, succession of disc shaped cookies 30 are delivered at 18 from, for example, an automatic oven such as Model No. 85 presently commercially available from Phoenix Cookies Machine Company, 2348 S. Canal Street, Chicago, Ill. The cookies 30 are moved along a path on the surface 16 from receiving area 18 by means of a train of movers 20 that project upward from two tracks 22. An arm 24 may serve to remove the cookie discs 30 from a turntable surface 25. A timing stop 24S, coupled to the drive of the machine 10 stops and then allows items to leave the turntable 25 at the proper intervals. The disc shaped items successively fall onto the area 18 and are advanced along the tracks 22 (as indicated by the arrows) by the movers 20. A pair of guides 26, 28 serve to keep or move the disc items 30 onto the desired pathway.

Figure 3:
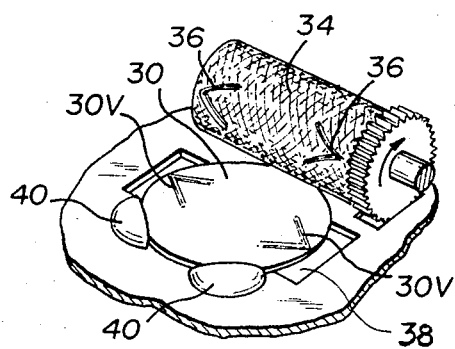
FIG. 3 is a perspective enlarged view of a portion of the apparatus of FIGS. 1 and 2 together with a cookie blank.

In accordance with one feature of the present invention, at the end of the tracks 22 is a roller 34 which (as better seen in FIG. 3) has a pair of V-shaped ridges 36. The roller 34 is geared to turn and be timed to have the ridges 36 impress on opposite sides of the cookies blank or item 30 so as to form automatically V-shaped grooves 30V therein. The V's are aligned on opposite ends of a diameter or line approximately through the center of the generally circular item 30. The surface of the roller 34 is knurled to provide a positive drive to the item 30.

For a definite example: for a cookie about three and one-eighth inches in diameter, the ridges 36 are formed of about one-sixteenth inch projection and one-sixteenth inch thickness, with the V forming a 60 degree angle and with sides of about one-half inch in length. This causes the grooves 30V to be about one-sixteenth inch deep in a cookie 30. (Such cookies are otherwise approximately one-eighth inch thick after leaving the roller 34.)

The powered roller 34 serves to form the grooves 30V on the cookie 30 and also to advance the cookie 30 forward.

As the cookie 30 leaves the roller 34 it advances over a rectangular slot or opening 38 and is stopped by stops 40 and guides 42 (FIGS. 1 and 2) centered about the opening 38. The cookie blank 30 is thus stopped at a position where it is centered over the slot 38.

As best seen in FIG. 1, a magazine 50 of paper "fortunes" (holding a stock of paper slip "fortunes" 50F) is mounted above the table 16 in a framework 52 that includes a cam groove 54 which has a roller cam 53 mounted in it. The groove 52-cam 53 arrangement serves to track a bifurcated plunger 44 as that is moved vertically. The plunger 44 is moved upward to contact the bottom of the magazine 50 and downward into slot 38. A controlled vacuum is connected to the plunger 44 to "grab" a fortune slip 50F and, turning down, move it to a cookie 30 that is over the slot 38. A suitable drive 55 and control means (see below at the discussion of FIG. 13) are provided to coordinate the delivery of the fortune 50F bearing plunger 44 with the arrival of a cookie 30 and for releasing the vacuum to leave the fortune with the cookie 30.

Figure 6:
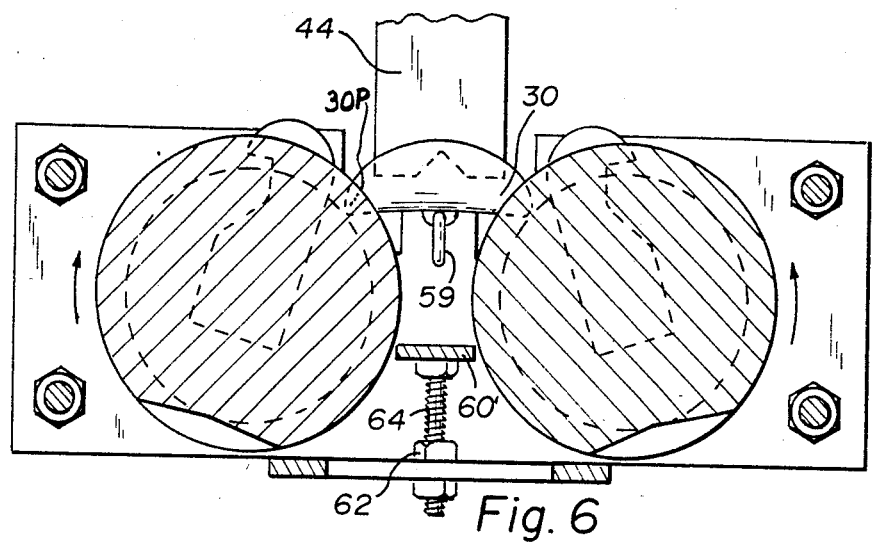
FIGS. 6-8 are sectional elevational views taken from the plane defined by the line 6—6 of FIG. 4 when looking in the direction of the arrows and illustrating successive steps in the fortune cookie shape forming process of the apparatus.

At the point when the cookie 30 has arrived over the slot 38 the bifurcated plunger 44 (FIG. 1) moves downward (preferably bearing a "fortune" slip of paper held by a vacuum coupled thereto) contacts the cookie 30 pushing it down through the slot 38. In the process the sides of the slot 38 bend the cookie 30 into a half-moon shape (as seen from the side) as shown in FIG. 6. This is essentially the same system as used in the aforementioned prior patent of the present inventor.

Below the slot is a transverse bar or beam 59 (See FIGS. 6, 2 and 4) to which the half moon shaped cookie comes to rest when pushed down by the plunger 44.

Figure 4:
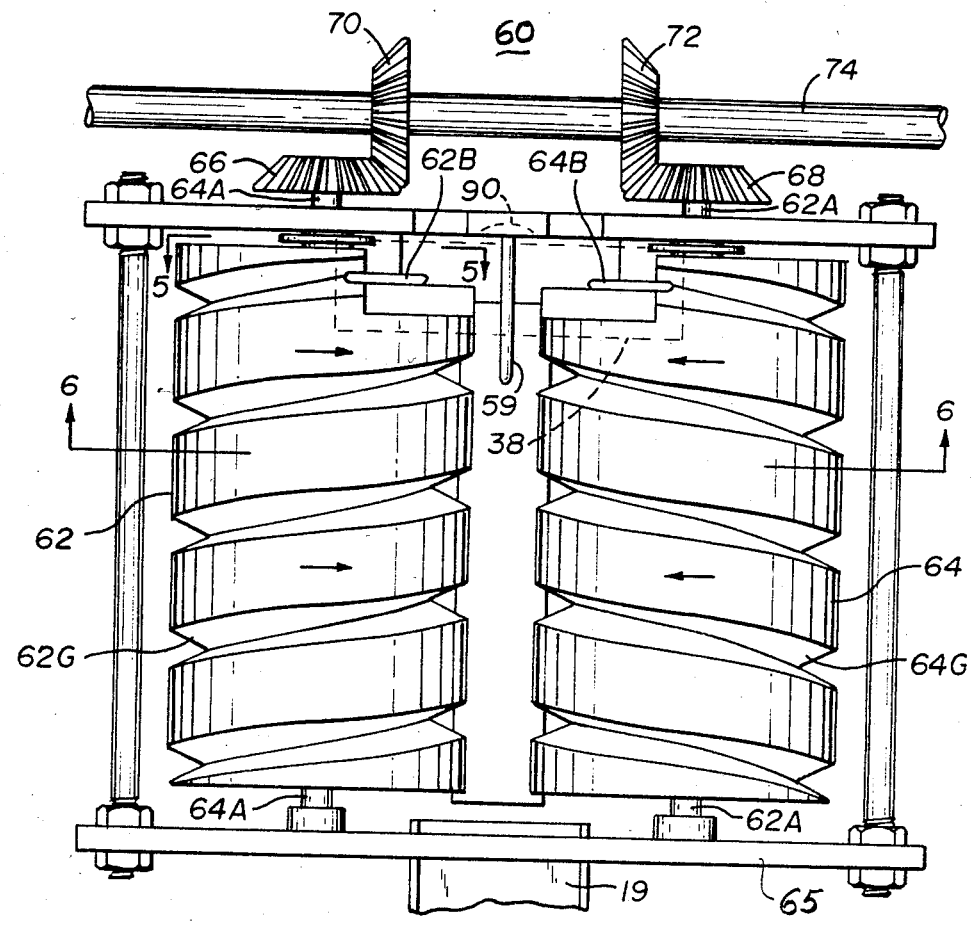
FIG. 4 is a plan view of another portion of the machine of FIGS. 1-3.

In accordance with a primary feature of the present invention, a novel means and method of forming and transporting the cookie is provided. This includes a groove forming and transporting apparatus 60 under the surface of the table 16. As best shown in FIG. 4, the apparatus 60 includes a pair of cylindrical gear or screws 62, 64 which have defined a V-shaped, (rounded in cross section) groove 62G, 64G that is cut helically about the cylindrical surface. The gear or screw grooves 62G, 64G are cut or formed to be mirror images of one another with the screw groove of one being right-handed and the other left-handed. The cylindrical gears 62, 64 are mounted for rotation in a suitable framework 65 by means such as the gears 66, 68 splined to an axle 62A and 64A which is splined to or made uniformally with the cylinders 62, 64. The gears 66, 68 mesh with respective gears 70, 72 on a front driven axle 74.

Note should be made that the V-shaped groove 62G and 64G align horizontally with each other at the area where the cylinders 62, 64 are closest to each other, as seen in FIG. 4. As the cylinders 62, 64 revolve toward each other this point of alignment advances in the horizontal plane.

The cylinders are coupled to be driven together and turned at the same rate in the direction of the arrows. At one of each cylinder 62, 64 the cylinder is cut away at the start of the groove 62G, 64G and fingers 62B, 64B provided aligned with the center of the groove. As better shown in FIG. 5 these fingers each project outward from the cylinder's surface and are carried and revolved with it.

Figure 7:
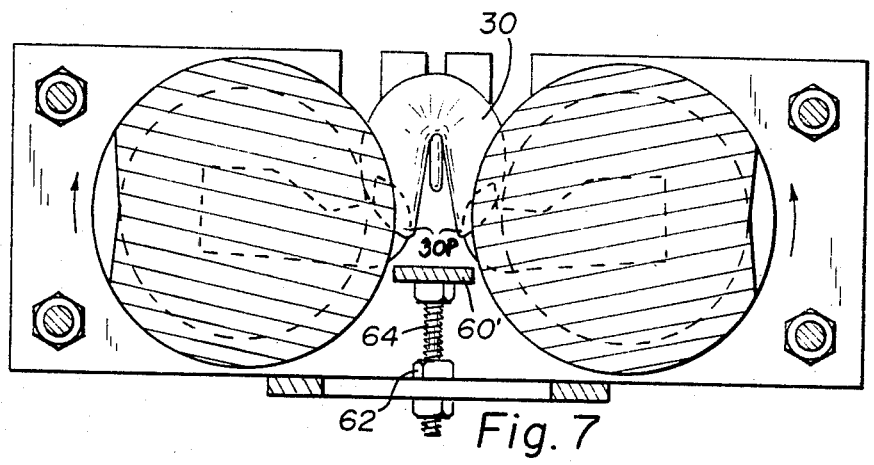

As best seen in FIG. 6, the fingers 62B, 64B are timed to move into contact with the cookie 30 that has been pushed down by the plunger 44 on to the beam 59. The fingers bend down the points 30P of the cookie 30 as shown in FIG. 7. The cookie 30 is also engaged by the sides of the grooves 62G, 64G and moved forward, eventually off of the end of beam 59.

The two grooves 62G and 64G are sweeping by the edges of the cookie and tend to conform them to its shape and to push and hold the cookie downward. A travel and shaping bar 60' is provided between the cylinders and serves to stop the downward movement of the new fortune cookies shaped item 30.

Figure 8:
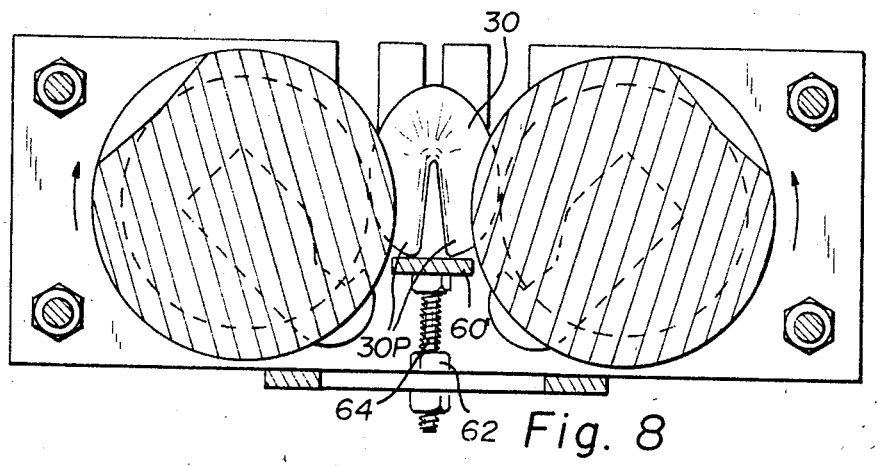

As shown in FIG. 8 the points 30P of the item 30 contact the upper surface of the bar 60' and slides along it as the cylinder grooves 62G and 64G advance the formed cookies 30 toward the shoot 19.

Now fortune cookies are not standardized in size nor precise shape. Many cookies are made with the points 30P widely separated in the finished (hardened) product. That means they are easy to break in shipping when points 30P are forced together by shifting about of the package. Others are (as shown in FIGS. 7 and 8) made with the points closer together. While most consumers are not aware of the differences, many restauranteurs and others have definite preferences. Also cookies formed as in FIG. 8 are more compact and tend to pack better for shipping because points 30P are held close together.

Unlike conventional fortune cookie forming machines, the machine 10 allows the user to select the shape of the cookie 30 by adjusting the height of the bar 60'. To this end, a pair of adjustment matching screw 61 and nut 62 are provided that may raise and lower the height of the bar 60'. Also the width of the top surface of the bar 60' should preferably approximate (but clear) the separation between the cylinders 62, 64 at whatever height the bar is set. Thus, replacement bars may be secured atop the bar 60' or in place of it.

As shown in FIG. 9 and FIG. 10 different bars 60', 60" are shown providing different shaped cookies, primarily in the spacing between the points. In the FIG. 10 embodiment the V-grooves 64G, 62G have pressed the cookie into an arrangement wherein the points are quite close to one another.

Also shown in FIG. 10 and also in FIG. 4 is an indentation 90 that accommodates the expanding side of the folded cookie 30 when on the beam 59.

As is well known, the plyable hot cookie blank 30 hardens as it cools to room temperature. As such, to aid in its hardening after being formed and held in the desired shape by the mechanism 60 a blower 70B (FIG. 1) is preferably provided on the surface 16 directing a current of air to and over the formed cookies 30 through an opening 82 formed on the surface 16 above the path over which the cookies travel with the cylinders 62, 64. This opening 82 allows hot air to rise quickly away from the cookies and aids in there cooling and hardening.

Figure 5:
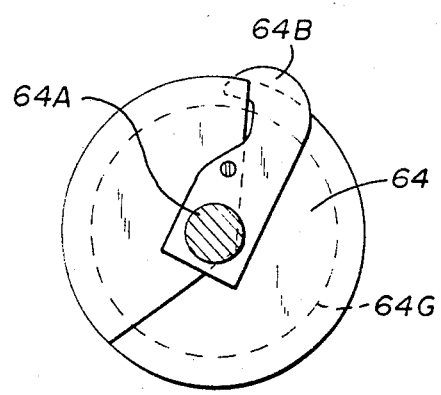
FIG. 5 is an elevational view, partly in section of a portion of the apparatus of FIG. 4 as seen from the plane defined by the line 5—5 in FIG. 4 when looking in the direction of the arrow.

An alternative arrangement for the fingers 64 of FIGS. 4 and 5 is depicted in FIGS. 11 and 12. In this case two fingers 62B' or 64B' are provided on each cylinders. The fingers wipe the cookie form its outside sides and hand it into the same way as shown in FIGS. 6, 7 and 8.

As mentioned, the components of the machine 10 are operated in timed coordination so that a cookie (or like food item) is smoothly transferred from the oven turntable 18 into a finished product at the shoot 19 or other suitable receptacle.

Figure 13:
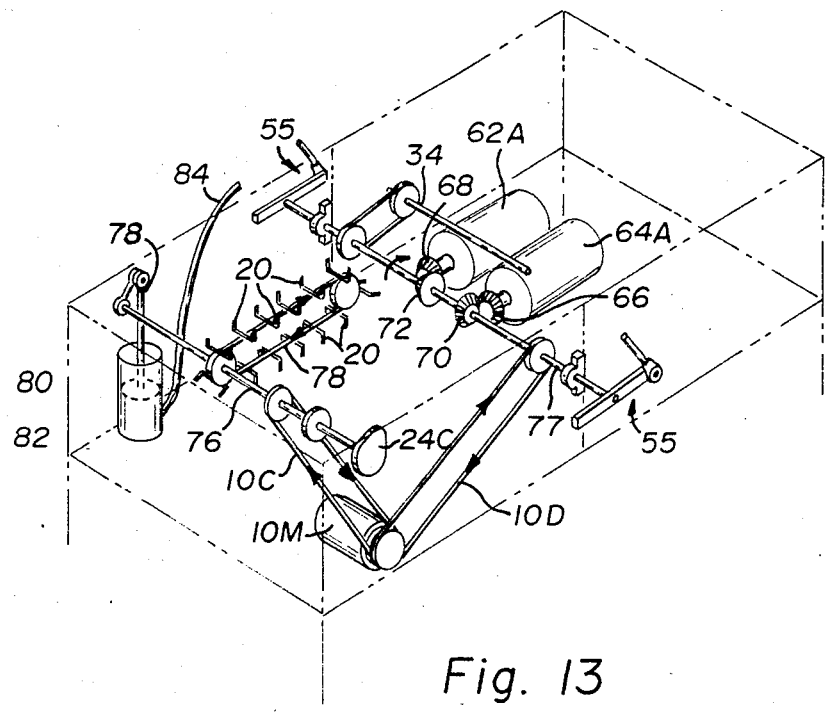
FIG. 13 is a schematic diagram of the drive mechanism of the machine of FIGS. 1-12.

To maintain the system in such a timed relationship, a drive is powered by an electric motor 10M (FIG. 1) that drives a pair of chain sprockets and chains 10C, 10D which in turn drive sprockets and transverse journaled drive shafts 74 (FIG. 4) and 76 shown schematically in FIG. 13. The forward drive shaft 74 rotates the mechanism 55 which raises and lowers the unit 44. It also, via a sprocket and a chain, rotates the roller 34. The rear drive shaft 76 drives a chain 78 that carries U-shaped elements that form the movers 20. It also rotates a cam 24C that raises the stop arm 24S and, through a bell crank mechanism 78, drives a piston 80 in an air cylinder 82 to create the vacuum in the line 84 that is coupled to the head 44. Thus, all of the elements (except for the blower 70B) are driven directly by the motor 10M through chain and gear drives so as to move in synchronism with one another.

Prototype has been constructed of the invention, which is substantially similar to the first embodiment. This prototype employed cylinders 62, 64 made of aluminum. The cylinders 62, 64 were of approximately 6 inches in diameter and 14 inches in length with a V-groove as described above. This prototype worked well and cookies of different selected point separations were formed on it. The fingers 62B and 64B were formed of approximately one-quarter inch thick stainless steel and ground to a point at the end and projected out approximately one-quarter inch from the surface of the cylinders. The beam 59 was formed of one-eighth inch in thickness, one and one-half inches long stainless steel. The roller 34 was formed of steel approximately 1.95 inches in diameter and three and one-quarter inches long. The machine was operated such that the cylinders 62 and 64 turned at approximately 58 rpm. This resulted in the forming of approximately 58 to 60 cookies per hour with a low rate of rejects or misformed cookies.

It should now be apparent that a novel food item forming apparatus and fortune cookie forming machine and method has been described which is versatile and any products and items of differing selected shapes. The use of the rotating device for forming, holding and moving the cookies or other items while they harden substitutes a smooth running mechanism for several intermittently operated components used in the prior art. The inventive mechanism is easier to make, use and has less wear and "downtime" for repair than such intermittently driven mechanisms. The prescoring of the food item blanks 30, by the feed roller 34 and ridges 36, provides a more easily formed blank, leading to less rejects for misforming and on an average, a more attractive cookie. The fortune paper in the cookies can't be seen until they have been broken open (by hand). Since the score lines are also in the inside of the folded cookies, they are not apparent in the finished item.

While one particular main embodiment and one alternative for one part of the invention have been shown and described, it will be obvious to those skilled in the art that changes and modifications may be made without departing from the invention and, therefore, the aim in the appended claims is to cover all such changes and modifications as fall within the true spirit and scope of the invention.

While the invention has been described in use in forming fortune cookies, it should be appreciated that other items can be so formed. For example, candies can be made into a fortune cookie shape using the machine. Thus it can be appreciated that the present invention can be used to form other items into the desired shape and not limited to only cookies.

I claim:

1. In a food processing machine of the type that processes a succession of disc shaped food items into fortune cookie shape wherein the disc shape is folded into a half-moon shape and corners of the half-moon shape are bent downwardly, the improvement comprising:
   a first cylindrical worm gear member defining a helical groove about its surface;
   a second cylindrical worm gear member defining a helical groove about its surface, said second gear member being of the same pitch as that of the first gear member but defined in the opposite direction; and
   means for mounting and driving the gear members in a side by side array such that the grooves may receive the sides of the fortune cookie shaped food items and advance them longitudinally parallel to the long axis of said groove members,
   said worm gear members also including means at one end thereof for folding the food item from its half-moon shape into substantially its final fortune cookie shape as it is delivered to the worm gear members.

2. The invention of claim 1 wherein said food item is in a relatively plastic but hardening state when delivered to said gear members and said grooves of said gear members being disposed such as to aid in holding the fortune cookie shaped member in its fortune cookie shape by sheer or sliding friction between the sides of the food item and the groove while the food item hardens.

3. The invention of claim 1 wherein said folding means are projecting cam fingers that revolve with the cylinders at the start of their helical grooves and serves to contact the corners of the item and bend them downward to the desired fortune cookie shape.

4. The invention of claim 3 wherein said cam fingers are two in number, one for each cylinder groove and they make contact with the interior within the folded half-moon shaped item and bend them downward.

5. The invention of claim 3 wherein said cam fingers are four in number, two for each cylinder grooves, and said fingers make contact on the outside surfaces of the corners of the half-moon shaped items and bend them downward.

6. A fortune cookie forming apparatus for automatically forming a succession of blank disc-shaped food items into the fortune cookie shape, comprising in combination:
   a framework;
   a prime rotary mover mounted on the framework;

a roller for advancing and pre-scoring blanks prior to forming;

means defining a slot over which the blanks are positioned after leaving said roller;

a plunger for striking the blanks over the slot to fold them into a half-moon shape having corners at the ends;

rotational means for grasping and folding the corners of the blank into a fortune cookie shape and for advancing it while it cools and hardens; and means connecting said prime rotary mover to said rotational means, said plunger, said means for moving and said roller, so as to move them in synchronism with one another.

7. The invention of claim 6 wherein said means connecting said prime rotary mover is chain and sprocket drives and gear drives.

8. The invention of claim 7 wherein said rotational means includes revolving fingers that simultaneously grasp and fold the opposite corners of the blank into the fortune cookie shape.

\* \* \* \* \*